United States Patent
Kampmann et al.

(10) Patent No.: US 8,374,587 B2
(45) Date of Patent: Feb. 12, 2013

(54) METHOD FOR CODEC NEGOTIATION AND SELECTION

(75) Inventors: Dirk Kampmann, Vaals (NL); Henning Buhr, Plombieres (BE); Karl Hellwig, Wonfurt (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 571 days.

(21) Appl. No.: 12/182,436

(22) Filed: Jul. 30, 2008

(65) Prior Publication Data

US 2009/0047936 A1 Feb. 19, 2009

Related U.S. Application Data

(60) Provisional application No. 60/955,696, filed on Aug. 14, 2007.

(51) Int. Cl.
| | |
|---|---|
| H04M 3/42 | (2006.01) |
| H04J 3/08 | (2006.01) |
| H04J 3/12 | (2006.01) |
| H04J 3/22 | (2006.01) |
| H04W 4/00 | (2009.01) |
| H04L 12/413 | (2006.01) |

(52) U.S. Cl. ........... 455/414.1; 455/510; 370/328; 370/327; 370/326; 370/522; 370/465

(58) Field of Classification Search .......... 455/414.1
See application file for complete search history.

(56) References Cited

U.S. PATENT DOCUMENTS

| | | | | |
|---|---|---|---|---|
| 2004/0095958 A1* | 5/2004 | Ejzak et al. | ............ | 370/465 |
| 2005/0037790 A1* | 2/2005 | Chang | ............ | 455/510 |
| 2005/0169207 A1* | 8/2005 | Muniere | ............ | 370/328 |
| 2006/0211425 A1* | 9/2006 | Bae et al. | ............ | 455/445 |
| 2007/0135165 A1* | 6/2007 | Junghanns et al. | ............ | 455/560 |
| 2007/0171841 A1 | 7/2007 | Witzel et al. | | |
| 2007/0242704 A1* | 10/2007 | Jiang | ............ | 370/522 |
| 2008/0279097 A1* | 11/2008 | Campion et al. | ............ | 370/229 |

FOREIGN PATENT DOCUMENTS

| | | |
|---|---|---|
| WO | WO 00/70885 A1 | 11/2000 |
| WO | WO 2006/090266 A1 | 8/2006 |
| WO | WO 2007/073602 A1 | 7/2007 |

OTHER PUBLICATIONS

3GPP TS 23.153—Out of Band Transcoder Control. 3GPP TS 23.153 v4.4.0. Dec. 2001.
3GPP TS 24.008—Mobile radio interface layer3 specification. 3GPP TS 24.008 v3.19.0, Jun. 2004.
3GPP TS 28.062—Inband Tandem Free Operation (TFO) of speech codecs. 3GPP TS 26.062 v4.6.0. Dec. 2004.
3GPP TS 48.008—Mobile Switching Centre—Base Station System (MSC-BSS)interface, 3GPP TS 48.008 V7.10.0. Jun. 2007.

* cited by examiner

*Primary Examiner* — Christopher M Brandt
*Assistant Examiner* — Muthuswamy Manoharan (57) ABSTRACT

A method of modifying a call setup message for a call from a first terminal to a second terminal, the call setup message being sent from the first terminal to a network node via an intermediate node which handles at least some signaling or traffic associated with the call, wherein the network node is responsible for negotiating call setup requirements for the call to the second terminal, the method comprising the steps of: intercepting the call setup message at the intermediate node; identifying one or more preferences or capabilities associated with the intermediate node which may impact the way in which the intermediate node can handle signaling or traffic associated with the call; modifying the call setup message based on information relating to said preferences or capabilities; and sending the modified call setup message to the network node, in order that the node can effect said negotiations based on the modified message.

21 Claims, 5 Drawing Sheets

| Octet | Parameter | MSB 8 | 7 | 6 | 5 | 4 | 3 | 2 | 1 LSB |
|---|---|---|---|---|---|---|---|---|---|
| 1 | Codec List | Codec List (see ITU-T Q.765.5) | | | | | | | |
| 2 | Length Indication (LI) | 30 | | | | | | | |
| 3 | Compat. Info | Compatibility Information | | | | | | | |
| 4 | Single Codec | Single Codec (see ITU-T Q.765.5) | | | | | | | |
| 5 | LI | 6 | | | | | | | |
| 6 | Compat. Info | Compatibility Information | | | | | | | |
| 7 | OID | ETSI OID (See ITU-T Q.765.5 [6]) | | | | | | | |
| 8 | CoID | UMTS_AMR_CoID | | | | | | | |
| 9 o | ACS | 12.2 | 10.2 | 7.95 | 7.40 | 6.70 | 5.90 | 5.15 | 4.75 |
| 10 o | SCS | 12.2 | 10.2 | 7.95 | 7.40 | 6.70 | 5.90 | 5.15 | 4.75 |
| 11 o | MACS | (spare) | (spare) | (spare) | (spare) | OM | MACS | | |
| 12 | Single Codec | Single Codec (see ITU-T Q.765.5) | | | | | | | |
| 13 | LI | 6 | | | | | | | |
| 14 | Compat. Info | Compatibility Information | | | | | | | |
| 15 | OID | ETSI OID (See ITU-T Q.765.5 [6]) | | | | | | | |
| 16 | CoID | FR_AMR_CoID | | | | | | | |
| 17 o | ACS | 12.2 | 10.2 | 7.95 | 7.40 | 6.70 | 5.90 | 5.15 | 4.75 |
| 18 o | SCS | 12.2 | 10.2 | 7.95 | 7.40 | 6.70 | 5.90 | 5.15 | 4.75 |
| 19 o | MACS | (spare) | (spare) | (spare) | (spare) | OM | MACS | | |
| 20 | Single Codec | Single Codec (see ITU-T Q.765.5) | | | | | | | |
| 21 | LI | 6 | | | | | | | |
| 22 | Compat. Info | Compatibility Information | | | | | | | |
| 23 | OID | ETSI OID (See ITU-T Q.765.5 [6]) | | | | | | | |
| 24 | CoID | HR_AMR_CoID | | | | | | | |
| 25 o | ACS | (spare) | (spare) | 7.95 | 7.40 | 6.70 | 5.90 | 5.15 | 4.75 |
| 26 o | SCS | (spare) | (spare) | 7.95 | 7.40 | 6.70 | 5.90 | 5.15 | 4.75 |
| 27 o | MACS | (spare) | (spare) | (spare) | (spare) | OM | MACS | | |
| 28 | Single Codec | Single Codec (see ITU-T Q.765.5) | | | | | | | |
| 29 | LI | 3 | | | | | | | |
| 30 | Compat. Info | Compatibility Information | | | | | | | |
| 31 | OID | ETSI OID (See ITU-T Q.765.5 [6]) | | | | | | | |
| 32 | CoID | EFR_CoID | | | | | | | | with o = optional octet

METHOD FOR CODEC NEGOTIATION AND SELECTION

CROSS-REFERENCE TO RELATED APPLICATIONS

This application claims the benefit of U.S. Provisional Application No. 60/955,696 filed Aug. 14, 2007, the disclosure of which is incorporated herein by reference.

BACKGROUND OF THE INVENTION

The present invention relates to improvements in or relating to Codec negotiation and selection, particularly but not exclusively in a radio access network.

For both, Tandem Free Operation (TFO) and Transcoder Free Operation (TrFO) by using Out-of-Band Transcoder Control (OoBTC), there is a continual effort to avoid speech quality impairment caused by unnecessary transcoding steps along the speech path. In order to achieve this both technologies rely on an exchange of lists of Codec types to be used on each sub-link of the speech path. Tandem Free Operation (TFO) is an in-band procedure used to pass compressed speech through a pulse code modulation (PCM) connection. TFO is applied after call setup and includes the exchange of Codec information between TFO-peers using an in-band protocol. The optimal common Codec is determined according to a predetermined set of rules by both peer nodes. Out-of-Band Transcoder Control (OoBTC) is a procedure between call control nodes (CCN), where a Codec is negotiated using an out-of-band protocol. This is applied before or at call setup and the selection of the optimal Codec is made by the terminating node. There are no fixed or predetermined selection rules.

In the call setup procedure of a call originating from a GSM mobile (also called the Mobile station (MS) or the GSM terminal) the Mobile Switching Center (MSC) server (MSC-S) at the originating side of the call receives information about the terminal supported Codec types of the MS. This information is sent from the MS to the MSC within a direct transfer application part (DTAP) message during the early call setup signaling. This message passes physically through the base station controller (BSC), although the BSC is not functionally involved in the communication. The originating MSC-S then performs Codec negotiation with the peer terminating MSC-S in order to determine an appropriate Codec to be used in the core network. This is generally referred to as the OoBTC procedure and generates the selected Codec (SC). The terminating MSC-S selects the SC, determines an available Codec list (ACL) and sends these (SC and ACL) back in a message to the originating MSC-S. The originating MSC-S then builds a list of possible speech Codec versions in the form of a speech Codec version list (SCVL) which is ordered in accordance with the originating MSC-S preferences. If any of the speech Codec versions are identical or compatible with the SC used in the core network, these are preferred over other Codec versions. This is due to the fact that this allows TFO operation on the GSM signal interface between the BSC and the MSC (A-Interface). The originating MSC-S then enables TFO in a media Gateway (MGW) node that connects to the A-interface. The originating MSC-S also requests channel assignment from the originating BSC so that the BSC can seize the radio bearer. The request includes the SCVL of possible Codec types. At the same time the originating BSC chooses an appropriate Codec type from the list and the core network bearer is seized using the negotiated Codec type (SC). The MSC-S may be notified that the bearer setup procedure has been performed successfully. A first transcoding unit within the originating base station system (BSS) and a second transcoder unit within the originating MGW perform the TFO negotiation. If the Selected Codec used in the core network and the Codec chosen by the originating BSC are compatible then TFO becomes operational and transcoding free operation is achieved at least on the originating side of the call. A complementary series of actions is performed by the terminating MSC, MGW, BSC and MS and if the Selected Codec used in the core network and the Codec chosen by the terminating BSC are compatible, then TFO becomes operational and transcoding free operation also on the terminating side of the call is achieved. If TFO becomes operational on both sides then end-to-end transcoding free operation is achieved, which is the ultimate goal.

If the call setup originates or terminates from different types of radio access network, there are variations of the above described process which may apply. However, there are a number of problems which exist with the above described process. The standardized/specified procedure for call setup requires the originating MSC-S to perform Codec negotiations within the core network prior to communicating an assignment message with the originating BSC. This assignment message is used to request the seizure of the relevant radio channel and can provide a preferred speech version list (PSVL) defining a set of speech Codecs that can be used for the call. Within the list the first Codec is generally the most preferred. The BSC is now free to select any speech Codec from this PSVL. The BSC decision occurs after the Codec is selected in the core network and based on the fact that the BSC does not know about the Codec negotiations or any end-to-end problems in the network. Accordingly, the BSC decision is based simply on a local view. This often results in the situation that the BSC is selecting a Codec that is not compatible with the Codec selected in the core network or in any other (terminating) BSC along the path of the call.

Alternatively, the BSC may select the Codec that is preferred by the MSC-S, but not one that supports TFO or transcoding free operation (TrFO). As a consequence TFO cannot be achieved on the A-interface (in general: on the interface between Core Network and Radio Access Network) and transcoding has to be performed which has negative impact on the speech quality of the call and/or increases the costs of Media Gateway resources.

There are a number of possible reasons why the BSC selects a Codec that is incompatible with the core network (i.e. does not select the first element in the received PSVL), these include:

The transcoding resources for the first Codec are not currently available to the BSC.
 The transcoding resources are available but TFO support is not available.
 Due to temporarily or locally limited radio channel capacity the BSC may select a half rate channel instead of a preferred full rate channel.

It is possible to correct for incompatibility and failed TFO setup through a change of the selected Codec in the core network. This can be achieved by means of an OoBTC midcall modification or negotiation procedure. However, this brings about the following disadvantages:

Changing the Selected Codec in the core network cannot occur without negative impact on the speech connection thereby reducing the overall speech quality of the call.
 Any change of the Selected Codec in the core network may trigger a change of the Codec used in the radio access on the other side of the call. In addition the other side of the call has the freedom to reject the new Selected Codec and as such the attempt to change the Selected Codec may completely fail.

Any change of the Selected Codec in the core network may lead to a mismatch towards the Codecs used in the radio access on the other side of the call, thereby reducing speech quality of the call.

Any change in the Selected Codec in the core network requires additional signaling and therefore additional network resources.

An OoBTC mid-call modification or negotiation procedure can be rejected by the terminating side resulting in unnecessary use of signaling resources.

An OoBTC mid-call modification or negotiation procedure may fail completely in mixed vendor or mixed configurations environments.

BRIEF SUMMARY OF THE INVENTION

One object of the present invention is to provide a method and apparatus for selecting and negotiating the Codec type in a radio access network, which overcomes at least some of the problems associated with the prior art.

Another object of the present invention is to provide a method and apparatus for improved coordination of Codec negotiation between the core network and the radio access network.

A still further object of the present invention is to provide a method and apparatus for improving TFO and TrFO operation in a combined radio access and Core network.

The present invention provides a method and system as described in the accompanying claims.

In accordance with one aspect of the present invention, there is provided a method of modifying a call setup message for a call from a first (originating) terminal to a second (terminating) terminal, the call setup message being sent from the first terminal to a network node via an intermediate node (e.g. originating BSC) and further on to a second intermediate node (e.g. the terminating BSC) which handles at least some signaling or traffic associated with the call, wherein the second intermediate network node is responsible for negotiating call setup requirements for the call to the second terminal, the method comprising the steps of: intercepting the call setup message at the intermediate node; identifying one or more preferences or capabilities associated with the intermediate node which may impact the way in which the intermediate node can handle signaling or traffic associated with the call; modifying the call setup message based on information relating to said preferences or capabilities; and sending the modified call setup message to the network node, in order that the node can effect said negotiations based on the modified message.

According to a second aspect of the present invention there is provided a module in an intermediate node in a network for modifying a call setup message for a call from a first terminal to a second terminal, the call setup message being sent from the first terminal to a network node via said intermediate node, which handles at least some signaling or traffic associated with the call, wherein the network node is responsible for negotiating call setup requirements for the call to the second terminal, the module comprising: a receiver for receiving the call setup message at the intermediate node prior to the network node commencing negotiations for call setup requirements; a processor module for identifying one or more preferences or capabilities associated with the intermediate node which may impact the way in which the intermediate node can handle signaling or traffic associated with the call and modifying the call setup message based on information relating to said preferences or capabilities and a transmitter for sending the modified call setup message to the network node, in order that the node can effect said negotiations based on the modified message.

In an embodiment of the invention, the step of modifying the call setup message comprises adding an appendix to the call setup message including said one or more preferences or capabilities.

In an embodiment of the invention, the step of modifying the call setup message comprises deleting content in the call setup message in accordance with said one or more preferences or capabilities.

In an embodiment of the invention, wherein the step of modifying the call setup message comprises adding content in the call setup message in accordance with said one or more preferences or capabilities.

In an embodiment of the invention, the step of modifying the call setup message comprises ordering content in the call setup message in accordance with said one or more preferences or capabilities.

In an embodiment of the invention, the step of modifying the call setup message comprises inserting one or more separators in the call setup message to indicate which content in the message is in accordance with said one or more preferences or capabilities.

In an embodiment of the invention, the step of intercepting the call setup message comprises intercepting a message associated with Codec types supported by the first terminal.

In an embodiment of the invention, the step of modifying the call setup message comprises modifying the call setup message to include information relating to the Codec types supported by the intermediate node.

In an embodiment of the invention this may be computer implemented.

There are a number of advantages provided by the various aspects of the present invention. Irrespective of the particular embodiment of the invention, the present invention provides a dynamic means by which an originating MSC can be appraised of resources and capabilities in respect of the base station or base station controller (BSC) or any other element in the network that impact the ability of the MSC to efficiently negotiate Codecs with other network elements. This is important in ensuring the efficient operation of the network and prevents over provisioning and the consequential cost implications as well as speech quality degradation.

Coordinating the selection of the relevant Codec at or before call setup ensures that any unusual local occurrences will be taken into consideration: for example, short-term peak load problems, pool shortages, geographical restrictions etc. . . . The improved coordination in Codec selection between the radio network and the core network improves the amount of speech calls where speech quality is optimized and media gateway resources are minimized. Also unnecessary and expensive OoBTC mid-call procedures are avoided when the Codec types cannot be matched. In addition, by adding SIP or SDP parameters the negotiation of Codec configuration and packaging can be established at an early point in the process. The invention leads to substantially improved end-to-end Codec selection and is an important step in removing transcoding from GERAN and transferring it to the media Gateway.

As previously indicated, in the prior art the DTAP message passes through the BSC but the BSC is not functionally involved in any processing of this message. The message is essentially obscured from the BSC. On the other hand the present invention makes the DTAP message available and visible to the BSC. In this way the BSC can influence the subsequent negotiation of the Codecs by the MSC-S.

BRIEF DESCRIPTION OF THE DRAWINGS

Reference will now be made, by way of example, to the accompanying drawings, in which.

DETAILED DESCRIPTION OF THE INVENTION

Figure 1:
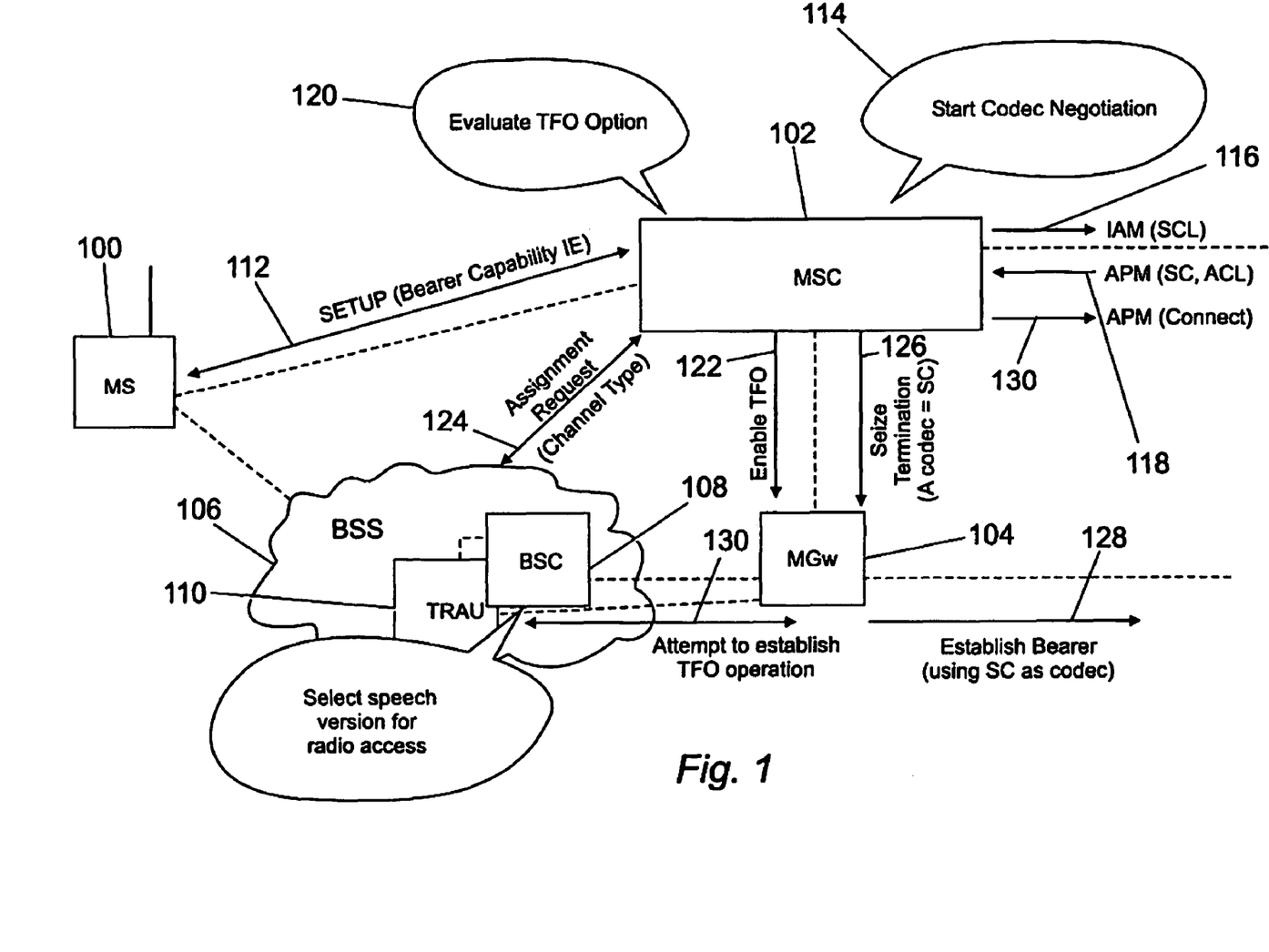
FIG. 1 is a block diagram of a call setup procedure for a GSM mobile originating call, in accordance with an embodiment of the invention, by way of example.

FIG. 1 shows the call setup procedure for a GSM Mobile originating call for a transcoding free operation call. FIG. 1 shows a mobile station 100 in communication with a mobile switching centre (MSC) server module (MSC-S) (not shown per se) in an MSC 102. The MSC is in communication with a media Gateway module 104 and a base station system module (BSS) 106. The BSS includes a base station controller node or module (BSC) 108 and a transcoding unit (TRAU) 110. The call originates from the mobile station (MS) 100 which may also be referred to as the GSM terminal. The GSM terminal communicates with the MSC-S associated therewith through the BSS and BSC. The originating GSM terminal indicates the supported Codec types (oMS-SCL: originating Mobile Station Supported Codec List) in a message to the MSC-S. Within the diagram of FIG. 1, the dotted lines show some of the physical connections between the various modules. It will be appreciated that there may be more. Furthermore, within the diagram of FIG. 1, arrows show logical connections also referred to as being in communication. The physical connections may be of any type appropriate to the connection. This may include a physical or logical connection such as, for example, a wireline or wireless connection. Any other appropriate connection may also be used, for example voice over IP, etc. The communication between the MSC-S and the GSM terminal is illustrated by arrow 112.

At (or even before) this point and in accordance with the present invention the process deviates from the prior art method in that the message from the GSM terminal passes physically through the BSC and is used by the BSC to improve the coordination of the Codec negotiation in a manner which will now be described in detail. The message is available and utilized by the BSC, rather than being opaque to the BSC as is the case in the prior art. In simple terms, the BSC informs the MSC about any possible restrictions on speech Codec type in oMS-SCL before the OoBTC procedure has even started. There are many different reasons for restrictions in the BSC, for example, shortage of transcoding resources or of TFO resources on a time or geographical basis. There is a considerable advantage in the BSC informing the MSC-S as early as possible of any restrictions and the invention provides a simple backward compatible procedure which overcomes many of the problems associated with the prior art. The various manners in which the BSC informs the MSC-S will now be described in greater detail.

The information relating to which Codecs are supported by the GSM terminal is sent to the MSC-S during call setup in any of the following messages at the originating side: setup, emergency setup and at the terminating side: call confirmed. There are a number of standardized manners in which this can be effected, for example the Speech version list (SVL) or the mobile station's Codec list (CL), but for simplicity all are referred to herein as the mobile station's supported Codec list (MS-SCL). This SVL is generally ordered in accordance with the preferences of the GSM terminal. The CL has no preference order and is an unordered bit map.

In an embodiment of the present invention the BSC is capable of modifying the Codec information in the MS-SCL even before information arrives at the MSC-S. The BSC can re-order the MS-SCL list according to TFO capabilities and preferences and also according to resource availability. The BSC is not forbidden to read the messages from the GSM terminal nor is it forbidden for the BSC to modify them in accordance with the relevant technology standards or specifications. Once the BSC has modified the Codec information in the MS-SCL the modified message can then be used by the MSC to improve the subsequent OoBTC Codec negotiation procedure as is described in greater detail below.

There are a number of different alternatives on how the BSC can indicate preferences or restrictions in the speech Codec selection. In a number of alternatives this can be accomplished by modifying or updating the MS-SCL message.

The BSC may delete a Codec from the MS-SCL based on its own preferences and capabilities, whilst essentially ignoring the preferences given by the GSM terminal. This method will work even when only the BSC has been upgraded in accordance with the present invention. It is not necessary to upgrade the MSC in order for this embodiment of the present invention to have a number of advantages. If the GSM terminal indicates a GSM full rate version 1, as is mandatory, this may not be included in the MS-SCL from the GSM terminal. In this case the MSC if it were not upgraded would automatically assume it is still mandatory and it would be necessary to use an alternative embodiment as indicated below in order for the BSC to modify the list if this full rate version 1 is not available for the BSC.

In order to separate the BSC supported Codec types from those that are not supported by the BSC, lack TFO functionality or for any other reason are currently not allowed, the BSC may include the GSM full rate version 1 as a separator in the MS-SCL. Any Codecs listed below the separator would be marked as not supported by the BSC, the TFO or currently not be allowed for whatever reason.

Similarly the BSC may use a GSM speech half rate version 2 as another separator between the Codecs that are supported and not supported by the BSC, TFO or not allowed for any other reason. The GSM speech half rate version 2 is not utilized in the 3GPP specification and as such would serve well as a separator. In addition, since the separator is not currently defined or used in the 3GPP specification it could also serve as an indicator for the MSC-S that the MS-SCL has been modified by the BSC in accordance with the present invention. It is possible that several different separators can be used in the list of Codecs supported by the BSC to indicate different capabilities. For example, a different separator to indicate Codecs which support:

a. Transcoding to PCM;
b. Transcoding to PCM plus TFO;
c. No transcoding.

In a further embodiment of the present invention the BSC may receive the MS-SCL from the GSM terminal only in form of the unordered CL and may then insert a speech version list (SVL) to indicate the BSC preferences and capabilities. The BSC may re-set entries in the CL which relate to Codecs that are either not BCS-supported, TFO-supported or for any other reason are currently not allowed. In order to indicate which entries in the GSM terminal MS-SCL list are supported by the BSC the BSC many introduced a separator (for example GSM speech full rate version 1 or GSM speech half rate version 2 as indicated above) in the added SVL. As above, the separator indicates that any Codecs listed below the separator are not supported by the BSC, TFO or disallowed for any other reason.

In a further advantageous embodiment of the present invention the BSC may add an appendix to the MS-SCL and then transmit the original unmodified MS-SCL and the appendix to the MSC. The appendix contains the currently supported BSC Codecs (BSC-SCL) listed in a priority order and may including a separator for example, as previously mentioned above. A third separator in the BSC-SCL may be the G.711 Codec (aLaw or uLaw), in short herein called "PCM". PCM in the BSC-SCL has the advantage that in can be used to indicate that PCM is supported on the A-interface, i.e. that the BSC supports transcoding to PCM. This ensures that the MSC receives dynamic and locally important BSC capabilities and preferences as early as possible thereby allowing the BSC to influence subsequent Codec negotiation. The process in the BSC is relatively simple because it does not need to analyze the individual messages received from the GSM terminal. Since different types of messages may be received from different GSM terminal there may be a number of different schemes by which the BSC adds and indicates the appendix. The BSC can prepare the appendix BSC-SCL in advance of receipt of a message from the GSM terminal. This may be in part or in total as at the time of receipt of the MS-SCL the prepared appendix may not longer be relevant due to changes relating to time, location, cell load etc. and may require an update. However, as the appendix is prepared in advance this embodiment has the advantage that it will speed up the process of adding the appendix to the MS-SCL. The existence of the appendix is an indication that the MS-SCL has been updated and the BSC is an upgraded BSC capable of carrying out the present invention.

In a still advantageous embodiment of the present invention the BSC adds an appendix to the MS-SCL as it is transmitted from the GSM terminal to the MSC. The appendix is built and structured as defined for the OoBTC process and the 3GPP technical specifications 23.153 and 26.103. This means that the BSC Codecs are listed in order of priority for the BSC and each Codec is defined with all parameters necessary for the OoBTC process between originating MSC and terminating MSC. This embodiment has a number of advantages including the fact that the BSC can communicate with the MSC directly and dynamically and includes all information that the MSC will require to carry out the OoBTC process, not just the Codec type, but also the Codec Configuration or even the range of Codec Configurations the BSC supports.

In an alternative embodiment the BSC adds an appendix to the MS-SCL as indicated above. However, the appendix is built and structured as defined for a session initiation protocol (SIP) as session description parameter (SDP). The appendix includes the BSC supported Codecs listed in priority order along with all additional parameters in SIP/SDP as may be required for ongoing processing; for example, packetisation time etc.

As can be seen from the embodiment there are many different ways in which the BSC can indicate to the MSC preferences and capabilities of the BSC exactly at the time of call setup. An important element of the present invention is that this is BSC capability and preference is indicated before the MSC starts any Codec negotiation and selection processes. In similar ways as described above the BSC may send the BSC-SCL also later during the call, e.g. for handover purposes.

In the embodiments presented above the BSC generally modifies the MS-SCL message in order to indicate the Codec preferences and capabilities of the BSC. However, it will be appreciated that other messages may be amended in order to communicate this information. For example the BSC-SCL message may be included in a layer 3 container message. The BSC Codec preferences and capabilities could be inserted into any relevant message in the layer 3 container message or in fact in any other appropriate message which passes through the BSC from the GSM terminal to the MSC or which is send directly from the BSC to the MSC.

Figure 3:
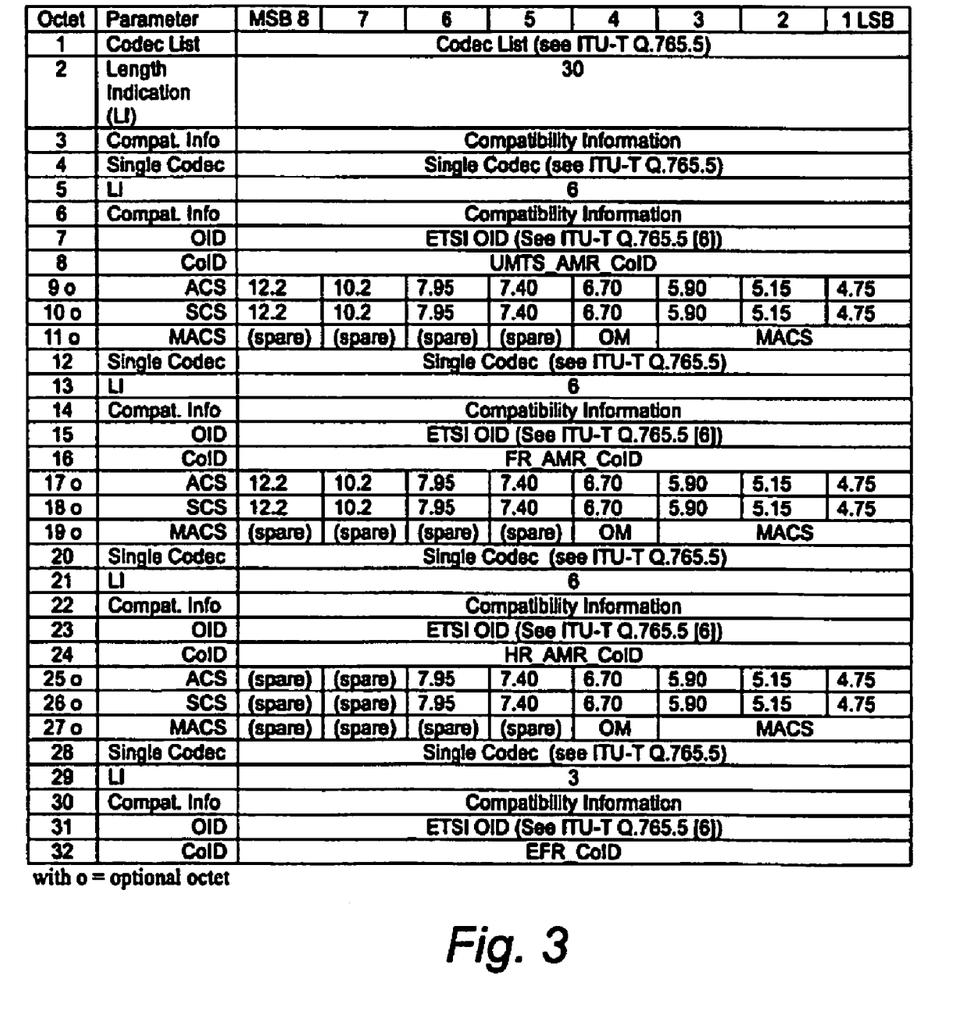
FIG. 3 is an example of an appendix to a call setup message, in accordance with an embodiment of the invention, by way of example.

FIG. 3 shows an example of an appendix in accordance with an embodiment of the present invention. This example describes how one arbitrary Codec list can be coded and sent between the originating and terminating MSCs in the OoBTC process. The example list includes 4 Codecs in a priority order:—UMTS_AMR; FR_AMR; HR_AMR; GSM_EFR.

Once the BSC Codec preferences and capabilities are indicated to the MSC the call setup process continues as follows and with reference to FIG. 1. The MSC-S goes on to start Codec negotiations by building a supported Codec list (SCL) 114 which is transmitted to the peer terminating MSC-S (not shown) for the call in a message 116. The terminating MSC-S (tMSC-S) contacts the terminating BSC (tBSC) and the terminating MS (tMS) sends a tMS-SCL and potentially a tBSC-SCL return message is added by the tBSC in a similar manner to that described with respect to the originating side. The tMSC-S determines the most suitable Codec for the terminating RAN, considering the received SCL, the TFO options on the terminating side, the tMS-SCL and the tBSC-SCL. The tMSC-S then also selects the SC taking all information into account. The tMSC-S also determines the common available Codec list (ACL). An alternative embodiment is: The tMSC-S determines the most suitable Codec SC for the core network, considering the received SCL, the TFO options on the terminating side, the tMS-SCL and the tBSC-SCL. The tMSC-S also determines the common available Codec list (ACL). The tMSC-S then also selects the most suitable Codec for the terminating RAN, taking the SC, the TFO options on the terminating side, the tMS-SCL and the tBSC-SCL into account.

Both (SC and ACL) are communicated in an APM (Application transport Mechanism) 118, from the terminating MSC-S back to the originating MSC-S. The originating MSC-S then evaluates the TFO options at the originating side and compares the SC with the speech versions supported by the GSM terminal 100 (oMS-SCL) and the BSC 108 (120) (oBSC-SCL). The originating MSC-S determines the most suitable Codec for the originating RAN. The originating MSC-S sends the determined RAN Codec to the MGW and enables TFO in media gateway node as shown by arrow 122. The originating MSC-S requests channel assignment from the originating BSC, including the Speech Codec Version List (SCVL) of possible Codec type for the BSC that can be used to seize the radio bearer. This includes channel type information and is shown by arrow 124. The SCVL is in priority order of the MSC-S and includes the determined RAN Codec at the top of the list, as the most preferred. The BSC then chooses an appropriate Codec type from the received SCVL list. Generally this is the first and most preferred Codec on the list and due to the fact that the BSC has already indicated preferences and capabilities earlier to the MSC-S the BSC will now be able to support the preferred Codec on the list. This maximizes the likelihood that TFO will establish between the BSC and the MGW. At the same time the MSC instructs the media gateway to seize the bearer for the core network using the negotiated Selected Codec type (SC) arrows 126 and 128. The next MSC-S in the chain may be notified that the bearer setting procedure has successfully been performed. An attempt to establish TFO operation is then carried out by the BSS and a connection is made by the MSC via an APM connect message, both are shown as arrows 130.

This enables the BSS to optimize radio resources dynamically based on load and also allows a high success rate for TFO for each call. This avoids the need for unnecessary over provisioning and very high costs associated with additional signaling.

If an embodiment operates with existing MSC-S's, i.e. the ones which do not recognize the appended BSC-SCL, it is possible that the MSC-S will not recognize some or all of the changes implemented by the BSC and so the MSC-S could still offer Codecs in the SCL that the BSC does not support. This could be improved if the BSC deletes all Codecs that it cannot support from the MS-SCL (as described above). In this way the MSC receives the list that only includes Codecs that can be supported by the BSC and only uses this for the subsequent OoBTC negotiation procedure. In this way it is possible to operate the present invention with a modified and upgraded BSC, but maintaining a present-day MSC-S. It may be possible, in certain situations, to upgrade the BSC by means of a hand-administration process.

The above described techniques relate to a call setup originating and terminating in a GSM and EDGE radio access network (GERAN), which supports transcoding of the RAN Codec to PCM, with or without TFO for some or all of these Codecs. The above described techniques are even more important once the transcoders are moved out of GERAN and into the Core Network.

The above described techniques relate to a call setup originating and terminating in a GSM and EDGE radio access network (GERAN) although it may equally apply to other types of radio access network (RAN). For example a UMTS terrestrial radio access node (UTRAN) implementation, a WLAN implementation, a WiMAX implementation or any other wireless or wireline access methods for example DSL.

At present the problems with an UTRAN implementation are less severe as typically only one Codec type and configuration are used. However, it is likely in the future that UTRAN will have many more speech Codecs and options and that the radio network controller (RNC) will at some time in the future need the ability to indicate preferences as is the case with the BSC. The present invention provides this capability and the RNC will be able to communicate in the same way as the BSC to express local, temporal or any other kind of preference in respect of Codec or any other option.

Another example of this is the standardization/specification of SIP-I for OoBTC in core networks, which will benefit from the present invention as well.

The present invention is also beneficial in the recently defined IMS architecture.

Irrespective of the particular embodiment of the invention, the present invention provides a dynamic means by which an originating MSC can be appraised of resources and capabilities in respect of the base station or base station controller (BSC) or any other element in the network (e.g. MGW) that impact the ability of the MSC to efficiently negotiate Codecs with other network elements. This is important in ensuring the efficient operation of the network and prevents over provisioning and the consequential cost implications.

It should be noted that the functions of the invention may be carried out in different network elements than those described herein. For example, in the future some of the transcoding may be shifted to the Core Network and carried out in the media gateway in the future. The present invention could be adapted to accommodate this. The BSC-SCL will then indicate to the MSC-S which Codecs are supported by the BSC a) with transcoding to PCM, or b) with transcoding to PCM plus TFO or c) without transcoding. In the latter case the MSC-S may select this Codec only if the selected MGW has sufficient transcoding capability for this Codec.

Coordinating the selection of the relevant Codec at or before call setup ensures that any unusual local occurrences will be taken into consideration: for example, for short-term peak load problems, pool shortages or geographical restrictions. The improved coordination in Codec selection between the BSC and the MSC inside the core network improves the amount of speech calls where speech quality is optimized and media gateway resources are minimized. Also unnecessary and expensive OoBTC mid-call procedures are avoided when the Codec types in GERAN and Core Network (CN) cannot be matched.

In addition, by adding SIP or SDP parameters the negotiation of Codec configuration and packaging can be established at an early point in the process. The invention leads to substantially improved end-to-end Codec selection and is an important step in removing transcoding from GERAN and transferring it to the media Gateway.

Figure 4:
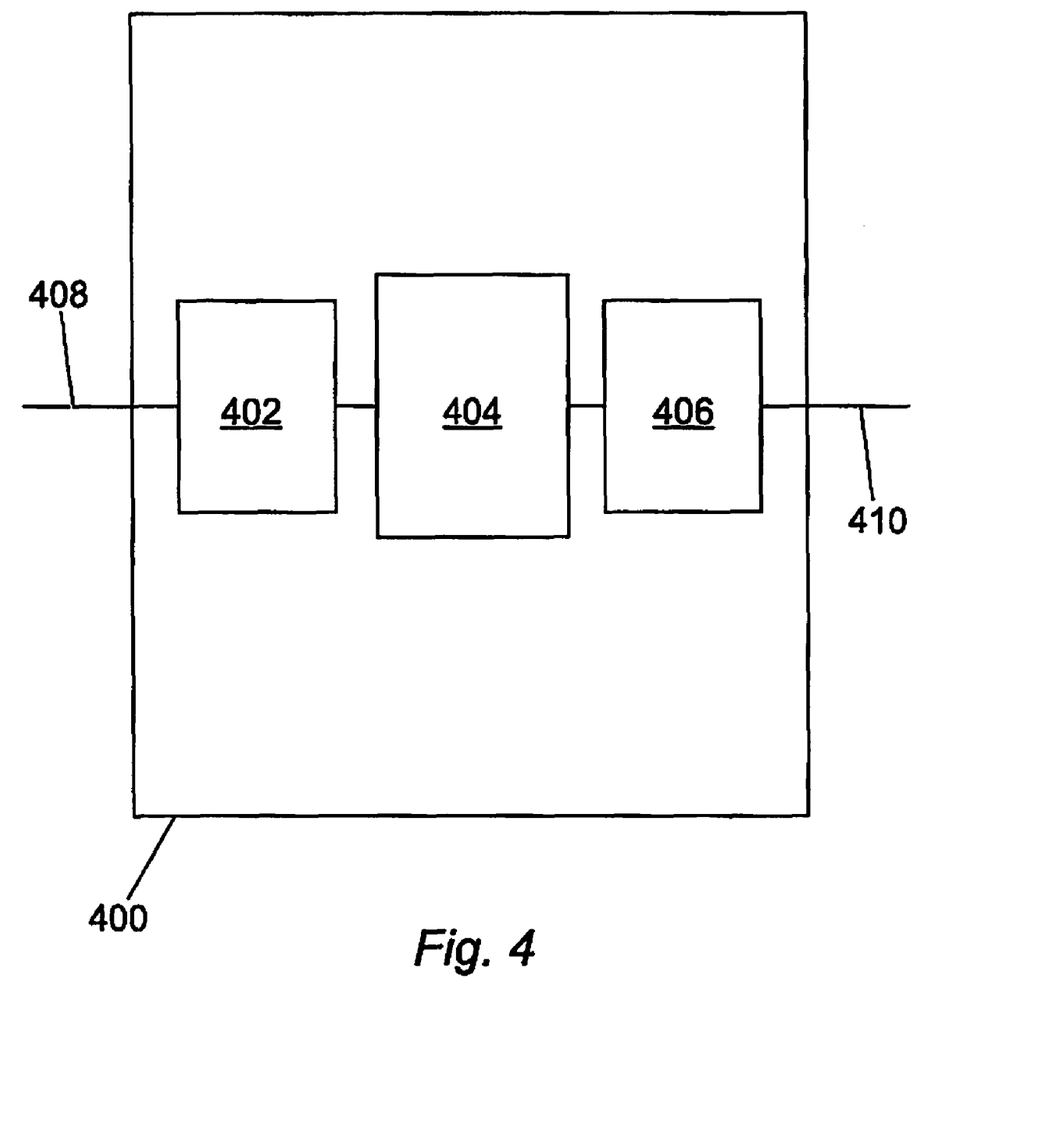
FIG. 4 is a block diagram of an intermediate node in the network which carries out the call setup procedure, in accordance with an embodiment of the invention, by way of example.

Referring now to FIG. 4, a block diagram of an intermediate node in the network (such as a BSC) is shown at 400. The intermediate node includes a receiver module 402, a processing module 404 and the transmitting module 406. The call setup signal 408 is received at the receiver module 402. In the processing module 404 the preferences and capabilities of the intermediate node identified and used to modify the call setup message as has previously been described above. The modified call setup message 410 is then transmitted by the transmitter 406 towards the network node (for example the MSC).

Figure 5:
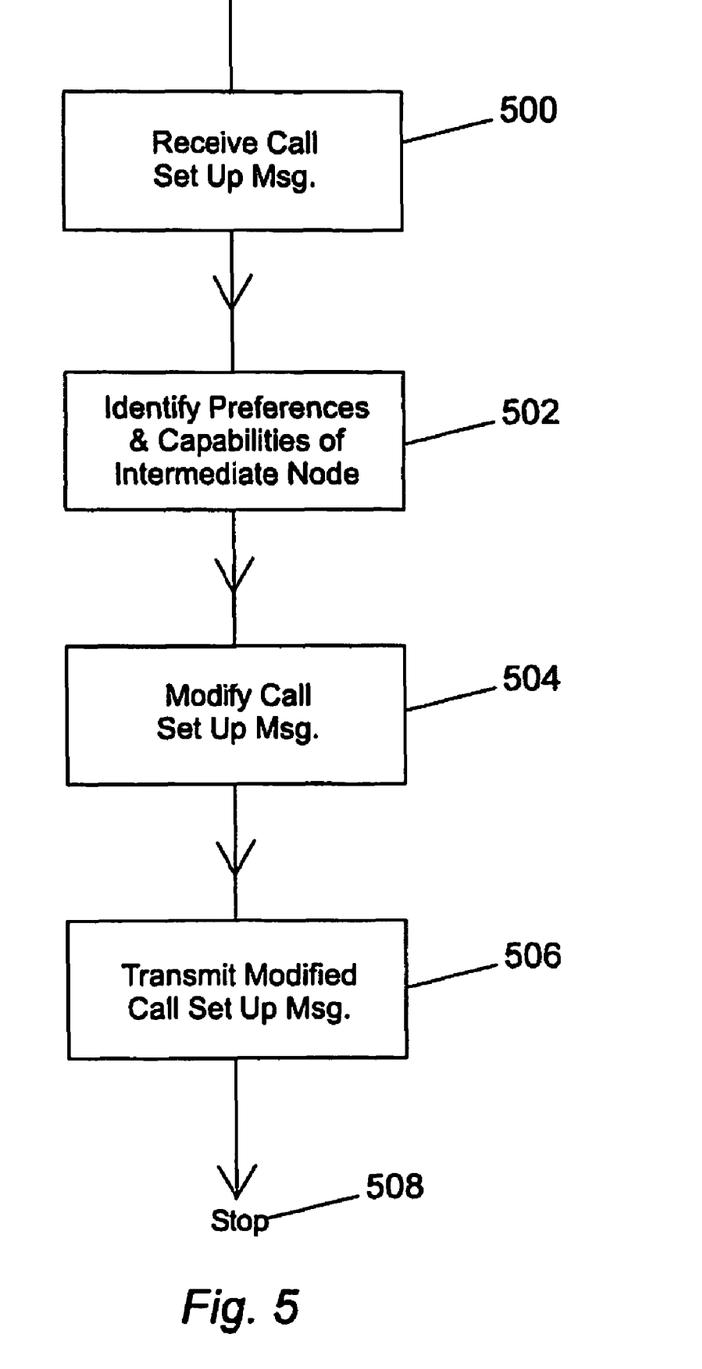
FIG. 5 is a flow chart for illustrating the method steps at an intermediate node in the network, in accordance with an embodiment of the invention, by way of example.

Similarly, in FIG. 5 the method steps at this intermediate node are illustrated. The intermediate node receives the call setup message at step 500. At step 502 the preferences and capabilities of the intermediate node are identified. This leads to a modification of the call setup message in step 504. There is then an onward transmission of the modified call setup message towards the network node in step 506. The process stops at step 508

In order to demonstrate further elements and advantages of the present invention the following examples are now presented. In all the examples it is assumed that the GSM terminal indicates support for the following Codecs:

FR-AMR hereinafter referred to as C1;
GSM-EFR hereinafter referred to as C2;
GSM-FR hereinafter referred to as C3 (this is also the separator Codec mentioned above); and
GSM-HR hereinafter referred to as C4.

The GSM terminal sends an MS-SCL in the following form {C1, C2, C3, C4}.

In a first example it is assumed that the BSC prefers the selection of Codec type C2 and supports this in TFO but the C1 Codec type is currently not allowed or supported by TFO. Accordingly the BSC reorders the MS-SCL as follows {C2, C3, C1, C4}, where C3 is a separator as indicated above. The MSC uses the information provided in the Codec sequence to build the supported Codec list for OoBTC Codec negotiation in the following form: {C2, PCM; C3, Configuration . . . }. In a second example it is assumed that the BSC prefers selection of C2 Codec type above C1 Codec type although both support TFO. In this case the BSC reorders the list as {C2, C1, C3, C4} and the MSC builds an appropriate supported Codec list. In the third example it is assumed that selection of C4 is necessary due to the fact that all full rate channel types are currently not allowed. In this case the BSC reorders the list as {C4, C3, C1, C2}. Due to knowledge in the MSC the supported Codec list built by the MSC-S cannot include C4, as this is not a viable choice for OoBTC; also C1 may offer a compromised speech quality and additional compression in the core network and should similarly be avoided. Accordingly the supported Codec list takes one of the following forms {PCM, C2, C1} or {PCM}. The later forces pulse code modulation (PCM) and forbids any other form of compression. Clearly there are many other examples that could be illustrated; all result in a modification (if required) of the message received by the MSC prior to the starting of Codec negotiations with the core network. Modification can include adding data, deleting data, reordering date and any other appropriate type of change.

Figure 2:
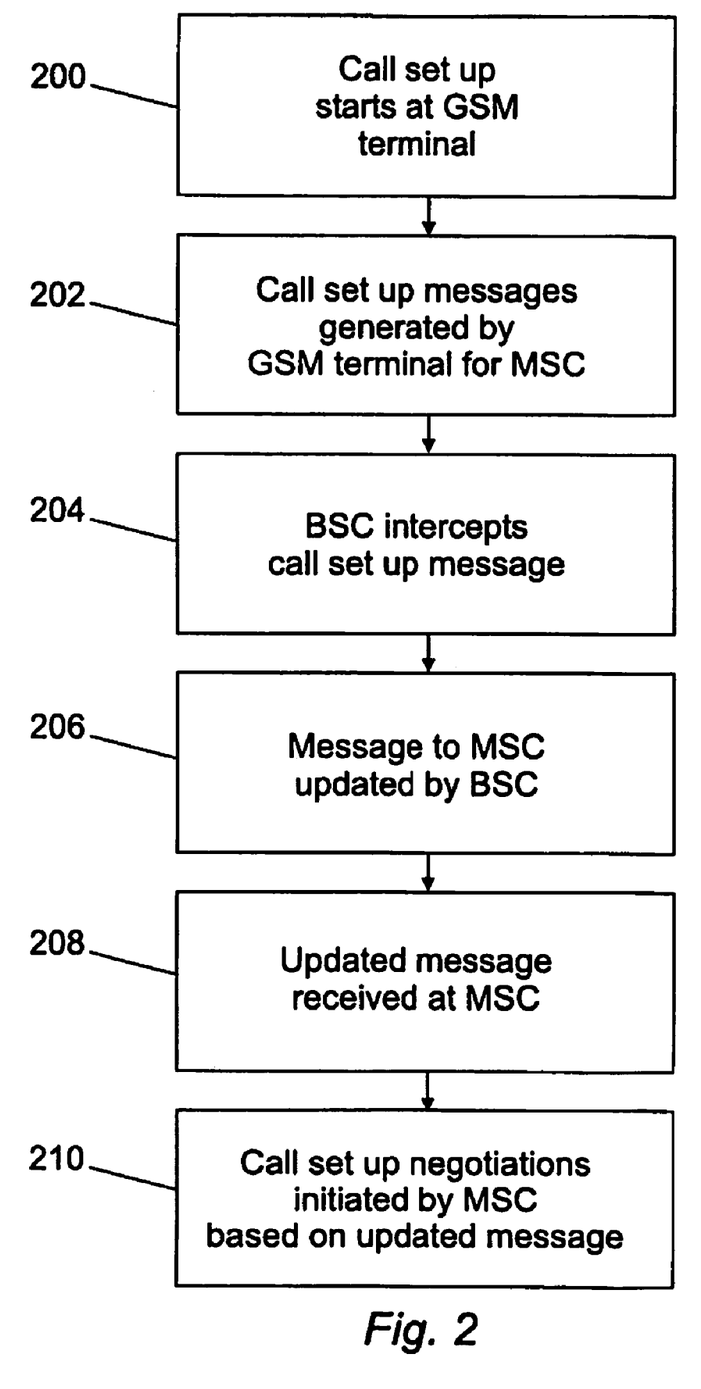
FIG. 2 is a flow chart for illustrating the method steps for a call setup procedure, in accordance with an embodiment of the invention, by way of example.

Referring now to FIG. 2, the method steps in accordance with an embodiment the present invention are described. A call setup procedure is initiated at the GSM terminal in response to a requirement for a call (step 200). This results in a call setup message being generated by the GSM terminal for onward transmission to the MSC (step 202). The call setup message may be of any type identified above or used in future developments of wireless network signaling. The BSC intercepts the call setup message before the MSC commences negotiations as part of the call setup routine (step 204). The interception can take place in any appropriate manner. It will be appreciated that for other types of radio access network it may be a device other than the BSC that intercepts the call setup message and effects the modification. The call setup message (in whatever form; for example, a MS-SCL message) is then updated or modified by the BSC to include an indication of the preferences and capabilities of the BSC at that time (step 206). The manner in which the message is updated, it is in accordance with any of the examples highlighted above or any other appropriate manner. The updated or modified message is then received at the MSC (step 208). The MSC then proceeds to setup Codec negotiations with other network elements in order to determine a match in the optimized Codec for the call in question (step 210). After this the call may proceed as indicated above.

It will be appreciated that the steps in the method may take place in a different order, without losing the many advantages of the present invention.

It will be further appreciated that the above described embodiments relate to the call originating side of a call setup, however equivalent actions may be carried out in the terminating side of the call as described above.

There may be other variations and alternatives for all or any element of the method and apparatus described above, which would fall within the scope and spirit of the present invention.

Although described with reference to a 3GPP compliant network, the invention may be employed in similar networks as well.

Furthermore, a person skilled in the art will understand that some or all of the functional entities as well as the processes themselves may be embodied in software or one or more software-enabled modules and/or devices.

What is claimed:

1. A method of modifying a call setup message for a call from a first terminal to a second terminal, the call setup message being sent from the first terminal to a negotiating network node via an intermediate node which handles signaling or traffic associated with the call, wherein the negotiating network node is responsible for negotiating call setup requirements for the call to the second terminal, the method comprising the steps of:
   intercepting the call setup message at the intermediate node;
   determining by the intermediate node, that a current network condition causes a resource restriction in the intermediate node that limits which codecs the intermediate node can use to handle signaling or traffic associated with the call;
   identifying by the intermediate node, one or more codec preferences or capabilities associated with the intermediate node that can be used by the intermediate node to handle signaling or traffic associated with the call while meeting the resource restriction caused by the current network condition;
   modifying by the intermediate node, the call setup message based on information relating to the identified codec preferences or capabilities; and
   sending the modified call setup message to the negotiating network node, so that the negotiating network node can effect negotiations based on the modified call setup message;
   wherein the call setup message is modified based on one or more of:
      adding an appendix to the call setup message including said one or more codec preferences or capabilities;
      deleting a codec preference or capability of the first terminal in the call setup message and substituting the one or more codec preferences or capabilities of the intermediate node;
      adding content in the call setup message in accordance with said one or more codec preferences or capabilities;
      ordering content in the call setup message in accordance with said one or more codec preferences or capabilities; and
      inserting a separator in the call setup message to indicate which content in the message is in accordance with said one or more codec preferences or capabilities.

2. The method of claim 1, wherein the step of intercepting the call setup message comprises intercepting a message associated with Codec types supported by the first terminal.

3. The method of claim 2, wherein the intermediate node is an originating Base Station Controller (BSC).

4. The method of claim 1, further comprising effecting the call in a transcoding free manner based on said one or more codec preferences or capabilities.

5. The method of claim 1, wherein the intermediate node is located in a GSM and Edge Radio Network (GERAN).

6. The method of claim 1, wherein the intermediate node is located in a UMTS terrestrial radio access network (UTRAN).

7. The method of claim 1, wherein the current network load is a traffic load within a cell where the first terminal is located.

8. The method of claim 1, wherein the step of modifying the call setup message includes modifying the call setup message by the intermediate node without communicating with the first terminal.

9. A module, in an intermediate node in a network, for modifying a call setup message for a call from a first terminal to a second terminal, the call setup message being sent from the first terminal to a negotiating network node via said intermediate node, which handles signaling or traffic associated with the call, wherein the negotiating network node is responsible for negotiating call setup requirements for the call to the second terminal, the module comprising:
- a receiver for receiving the call setup message at the intermediate node prior to the negotiating network node commencing negotiations for call setup requirements;
- a processor module configured to:
  - determine that a current network condition causes a resource restriction in the intermediate node that limits which codecs the intermediate node can use to handle signaling or traffic associated with the call;
  - identify one or more codec preferences or capabilities associated with the intermediate node that can be used by the intermediate node to handle signaling or traffic associated with the call while meeting the resource restriction caused by the current network condition; and
  - modify the call setup message based on information relating to the identified codec preferences or capabilities without communicating with the first terminal; and
- a transmitter for sending the modified call setup message to the negotiating network node, so that the negotiating network node can effect said negotiations based on the modified call setup message;
- wherein the call setup message is modified based on one or more of:
  - adding an appendix to the call setup message including said one or more codec preferences or capabilities;
  - deleting a codec preference or capability of the first terminal in the call setup message and substituting the one or more codec preferences or capabilities of the intermediate node;
  - adding content in the call setup message in accordance with said one or more codec preferences or capabilities;
  - ordering content in the call setup message in accordance with said one or more codec preferences or capabilities; and
  - inserting a separator in the call setup message to indicate which content in the message is in accordance with said one or more codec preferences or capabilities.

10. The module of claim 9, wherein the call setup message comprises a message associated with Codec types supported by the first terminal.

11. The module of claim 9, wherein the intermediate node is one of an originating Base Station Controller (BSC) or a terminating BSC.

12. The module of claim 9, wherein the module is in communication with at least one of said first or second terminals.

13. The module of claim 9, wherein the current network load is a traffic load within a cell where the first terminal is located.

14. The module of claim 9, wherein the processor module is configured to modify the call setup message based on information relating to the identified codec preferences or capabilities without communicating with the first terminal.

15. A module, in a network operating in a transcoding manner or a transcoding free manner, for modifying a call setup message for a call from a first terminal to a second terminal, the call setup message being sent from the first terminal to a negotiating network node via an intermediate node, which handles at least some signaling or traffic associated with the call, wherein the negotiating network node is responsible for negotiating call setup requirements for the call to the second terminal, the module comprising:
- a receiver for receiving the call setup message at the intermediate node prior to the negotiating network node commencing negotiations for call setup requirements;
- a processor module configured to:
  - determine that a current network condition causes a resource restriction in the intermediate node that limits which codecs the intermediate node can use to handle signaling or traffic associated with the call;
  - identify one or more codec preferences or capabilities associated with the intermediate node that can be used by the intermediate node to handle signaling or traffic associated with the call while meeting the resource restriction caused by the current network condition; and
  - modify the call setup message based on information relating to the identified codec preferences or capabilities without communicating with the first terminal; and
- a transmitter for sending the modified call setup message to the negotiating network node, so that the negotiating network node can effect said negotiations based on the modified message;
- wherein the call setup message is modified based on one or more of:
  - adding an appendix to the call setup message including said one or more codec preferences or capabilities;
  - deleting a codec preference or capability of the first terminal in the call setup message and substituting the one or more codec preferences or capabilities of the intermediate node;
  - adding content in the call setup message in accordance with said one or more codec preferences or capabilities;
  - ordering content in the call setup message in accordance with said one or more codec preferences or capabilities; and
  - inserting a separator in the call setup message to indicate which content in the message is in accordance with said one or more codec preferences or capabilities.

16. The module of claim 15, wherein the appendix is a terminating Base Station Controller Supported Codec List (tBSC-SCL).

17. The module of claim 15, wherein the call setup message comprises a message associated with Codec types supported by the second terminal.

18. The module of claim 15, wherein the intermediate node is a Base Station Controller (BSC).

19. The module of claim 15, wherein the module is in communication with at least one of said first or second terminals.

20. The module of claim 15, wherein one or more codec types supported by the first terminal are deleted from, added to, or ordered in a terminating Mobile Station Supported Codec List (tMS-SCL).

21. The module of claim 15, wherein the separator is inserted into a terminating Base Station Controller Supported Codec List (tBSC-SCL), or a terminating Mobile Station Supported Codec List (tMS-SCL).

* * * * *